United States Patent
Hamada et al.

(10) Patent No.: US 6,946,219 B2
(45) Date of Patent: Sep. 20, 2005

(54) SEALED PRISMATIC BATTERY CONNECTED VIA OPENINGS WITH CONDUCTIVE CONNECTION PLATES

(75) Inventors: Shinji Hamada, Toyohashi (JP); Toyohiko Eto, Toyota (JP); Takashi Asahina, Toyohashi (JP)

(73) Assignees: Matsushita Electric Industrial Co., Ltd., Osaka (JP); Toyoda Jidosha Kabushiki Kaisha, Aichi (JP)

( * ) Notice: Subject to any disclaimer, the term of this patent is extended or adjusted under 35 U.S.C. 154(b) by 124 days.

(21) Appl. No.: 10/346,104

(22) Filed: Jan. 17, 2003

(65) Prior Publication Data

US 2003/0157402 A1 Aug. 21, 2003

(30) Foreign Application Priority Data

Jan. 18, 2002 (JP) .................................... 2002-009511
Jul. 5, 2002 (JP) .................................... 2002-196671

(51) Int. Cl.$^7$ .............................................. H01M 6/46
(52) U.S. Cl. ..................... 429/153; 429/160; 429/161; 429/185
(58) Field of Search ...................... 429/57, 157, 158, 429/160, 161, 185, 7, 123, 99, 149, 153, 176; 439/500, 504; 204/267; 320/116, 119

(56) References Cited

FOREIGN PATENT DOCUMENTS

| EP | 1087449 | * 3/2001 | ............ H01M/2/02 |
|---|---|---|---|
| JP | 2001-093503 | 4/2001 | |

OTHER PUBLICATIONS

English Language Abstract of JP Appln. No. 2001-093503.

* cited by examiner

Primary Examiner—Raymond Alejandro
(74) Attorney, Agent, or Firm—Greenblum & Bernstein, P.L.C.

(57) ABSTRACT

A sealed prismatic battery having a battery case made of a plurality of prismatic cell cases coupled together via partition walls, electrode plate groups, and collectors bonded to lead portions on both sides of the electrode plate groups. In at least one side wall of the battery case is formed openings at locations corresponding to the partition walls such as to open to the cell cases on both sides of the partition walls. Pairs of conductive connection plates are connected to each other through the partition walls and formed with connection pieces that face the openings. The collectors are connected together via the conductive connection plates, i.e., they are connected to the connection pieces after the electrode plate groups are encased in the cell cases, and the openings are sealed by sealing plates in a manner that separates the cell cases.

11 Claims, 6 Drawing Sheets

SEALED PRISMATIC BATTERY CONNECTED VIA OPENINGS WITH CONDUCTIVE CONNECTION PLATES

The present disclosure relates to subject matter contained in priority Japanese Patent Application Nos. 2002-9511 and 2002-196671, filed on Jan. 18, 2002 and Jul. 5, 2002, respectively, the contents of which is herein expressly incorporated by reference in its entirety.

BACKGROUND OF THE INVENTION

1. Field of the Invention

The present invention relates to a sealed prismatic battery, and particularly to a prismatic battery module consisting of a plurality of cells with lower internal resistance.

2. Description of Related Art

One known rechargeable battery module consisting of a plurality of cells to achieve required power capacity has the following structure: The plurality of prismatic cells are arranged in parallel, with their longer lateral walls in contact with each other, and united by restraining bands together with end plates placed on the outer sides of the cells at the either end. Leads extending from the top ends of electrode plates of the cells upwards are connected to terminals mounted in the lid of the battery case, and these terminals of the cells are connected to each other via connection plates.

The cells are connected via a long connection path with many connection parts in this battery, resulting in large components' resistance. In fact, the proportion of the components' resistance in such a battery to reaction resistance caused by the reaction between positive and negative electrode plates and liquid electrolyte in the battery was as high as 40 to 50%, and the high heat generation because of the large internal resistance was a major barrier to the realization of higher power output or improvement in battery life. There was also the problem of high costs because of the large number of components required for the complex connection structure of the cells.

Figure 6:
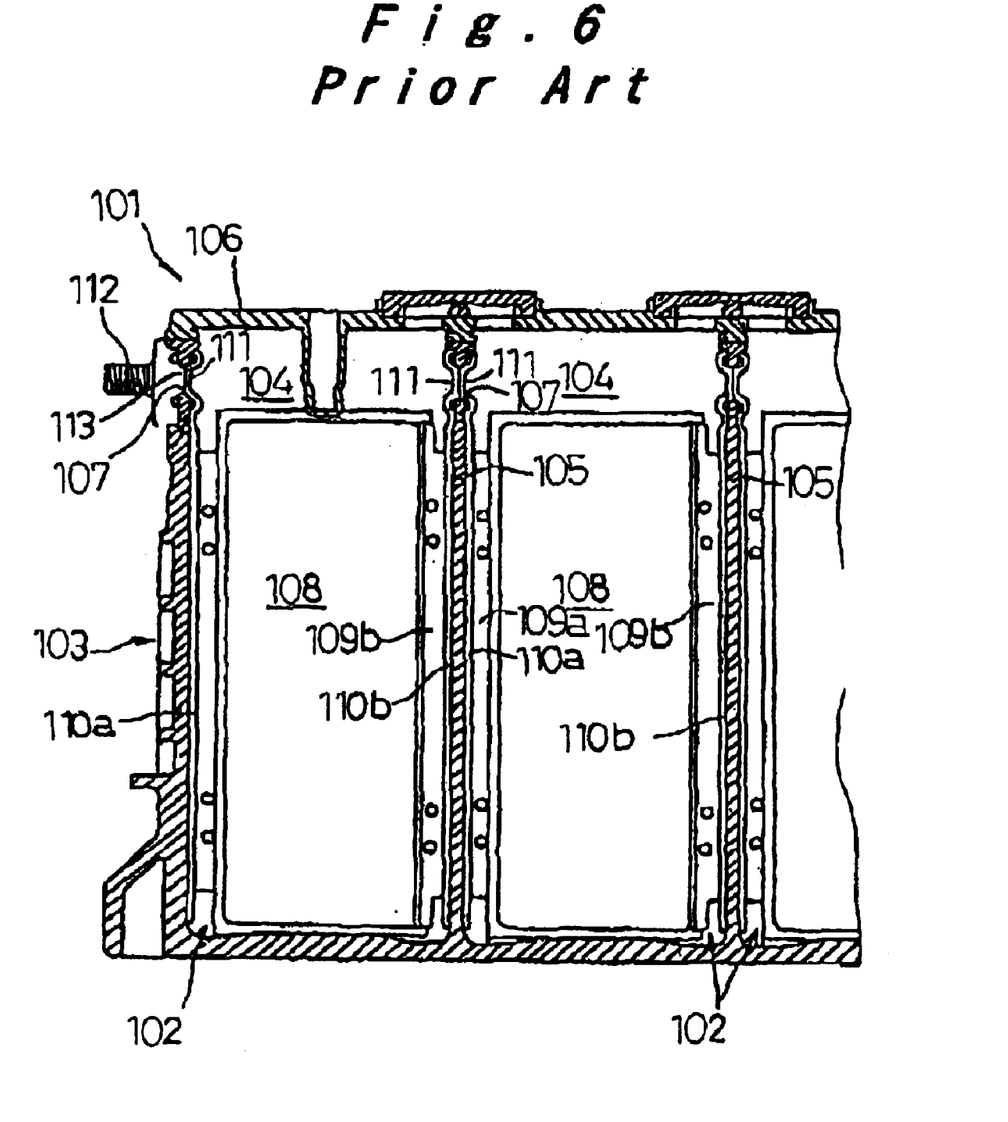
FIG. 6 is a partial longitudinal cross-sectional front view of a conventional sealed prismatic battery.
Figure 7:
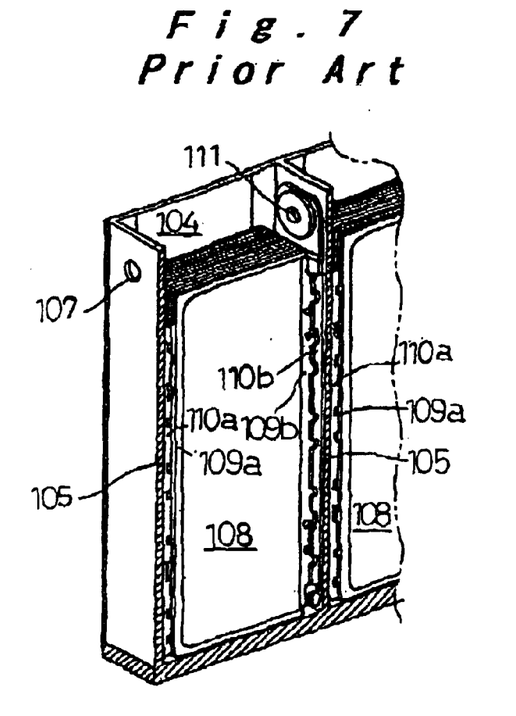
FIG. 7 is a partly broken perspective view of the battery case of the conventional battery.

In view of this, the applicants of the present invention have proposed a sealed prismatic battery 101 containing a plurality of cells 102 shown in FIG. 6 and FIG. 7. The battery 101 has a flat prismatic battery case 103 made of prismatic cell cases 104, which have short lateral walls and long lateral walls, of serially arranged cells 102. These cells are connected together in such a manner that their short lateral walls are used as partition walls 105 between the cells. The open top ends of the cell cases 104 are closed by an integral lid 106. Connection holes 107 are formed in the short lateral walls of the cell cases 104 at the far ends and in an upper part of each partition wall 105. Each cell case 104 constitutes a cell 102, accommodating liquid electrolyte and an electrode plate group 108 consisting of stacked-up rectangular positive and negative electrode plates and separators interposed in between them. Lateral edges on one side of the alternately stacked-up positive and negative electrode plates are protruded in opposite directions to form positive and negative leads 109a, 109b, respectively, to which collector plates 110a, 110b are connected by welding or the like.

In an upper part of the collector plates 110a, 110b is protruded a connection boss 111 which fits into the connection hole 107. The connection bosses 111 of positive and negative collector plates 110a, 110b are connected together by welding between adjacent cell cases 104. In the connection holes 107 in the end faces of the cell cases 104 at either far end are fitted positive and negative connection terminals 112 with connection bosses 113, respectively, and these connection bosses 113 are each connected to the connection bosses 111 of positive and negative collector plates 110a, 110b by welding. The plurality of cells 102 are thus connected in series in the battery case 103 such as to output power via the connection terminals 112 at both ends.

Figure 8:
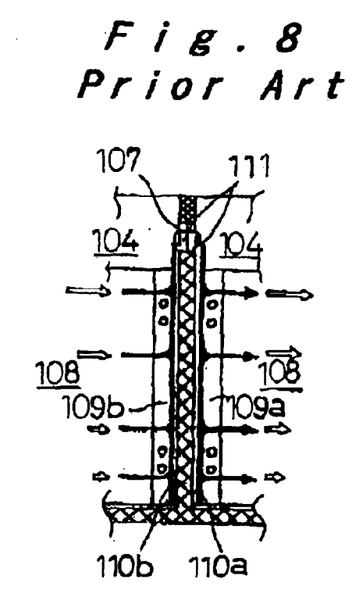
FIG. 8 is a diagram for showing the current paths in the conventional battery.

In this structure, however, while the current path from the positive and negative electrode plates to their respective leads 109a, 109b and collector plates 110a, 110b is short, the connection path between adjacent collector plates 110a, 110b is long as indicated by the arrows in FIG. 8, since they are connected via one welded portion at the tips of their respective connection bosses 111 at the top. Also, because they are connected at one location, the internal resistance is high. Furthermore, because of this detouring connection path, the current distribution in the electrode plate group 108 is uneven as indicated by white arrows, i.e., more current flows at portions nearer to the connected part of the collector plates 110a, 110b. As a result, power generation of the electrode plate group 108 is not uniform, leading to power loss.

SUMMARY OF THE INVENTION

The present invention has been devised in light of the problems in prior art described above, its object being to provide a sealed prismatic battery having lower internal resistance per cell and being capable of outputting higher power by ensuring that power generation of all the electrode plate groups is uniform.

A sealed prismatic battery according to the present invention includes:

a prismatic battery case made of a plurality of prismatic cell cases coupled together via partition walls;

a plurality of electrode plate groups respectively encased in the cell cases and comprised of a plurality of positive electrode plates and a plurality of negative electrode plates alternately stacked upon one another with separators interposed therebetween, one side edge of the positive electrode plates and the other side edge of the negative electrode plates being protruded in opposite directions to form respective lead portions; and a plurality of collectors each bonded to the lead portions on both sides of the electrode plate groups, wherein a plurality of openings are formed at least in one side wall of the prismatic battery case at locations corresponding to the partition walls such as to bridge across two adjacent cell cases on both sides of each partition wall, pairs of conductive connection plates are arranged on both sides of each of the partition walls such as to be connected together through the partition walls, part of the conductive connection plates facing the openings, the collectors are connected to the part of the conductive connection plates facing the openings after the electrode plate groups are accommodated in the cell cases, and the openings are sealed in a manner that separates the cell cases.

With this structure, collectors of adjacent cells facing each other via the partition walls are connected together at a location in the side wall of the prismatic battery case via the pair of conductive connection plates that extend through the partition walls. Consequently, collectors can be connected together at a desired location, and the connection path is made shorter, whereby the connection resistance between adjacent cells is reduced. Also, the current distribution between adjacent cells is made even, which further reduces the internal resistance per cell and makes power generation of the electrode plate groups uniform, leading to higher power output. The connection between the conductive connection plates and collectors is readily achieved by connecting them at the openings formed in the side wall. The openings are tightly sealed after establishing the connection, so that no liquid leakage occurs.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

One embodiment of a sealed prismatic battery according to the present invention will be hereinafter described with reference to FIG. 1A to FIG. 4B.

Figures 1A, 1B:
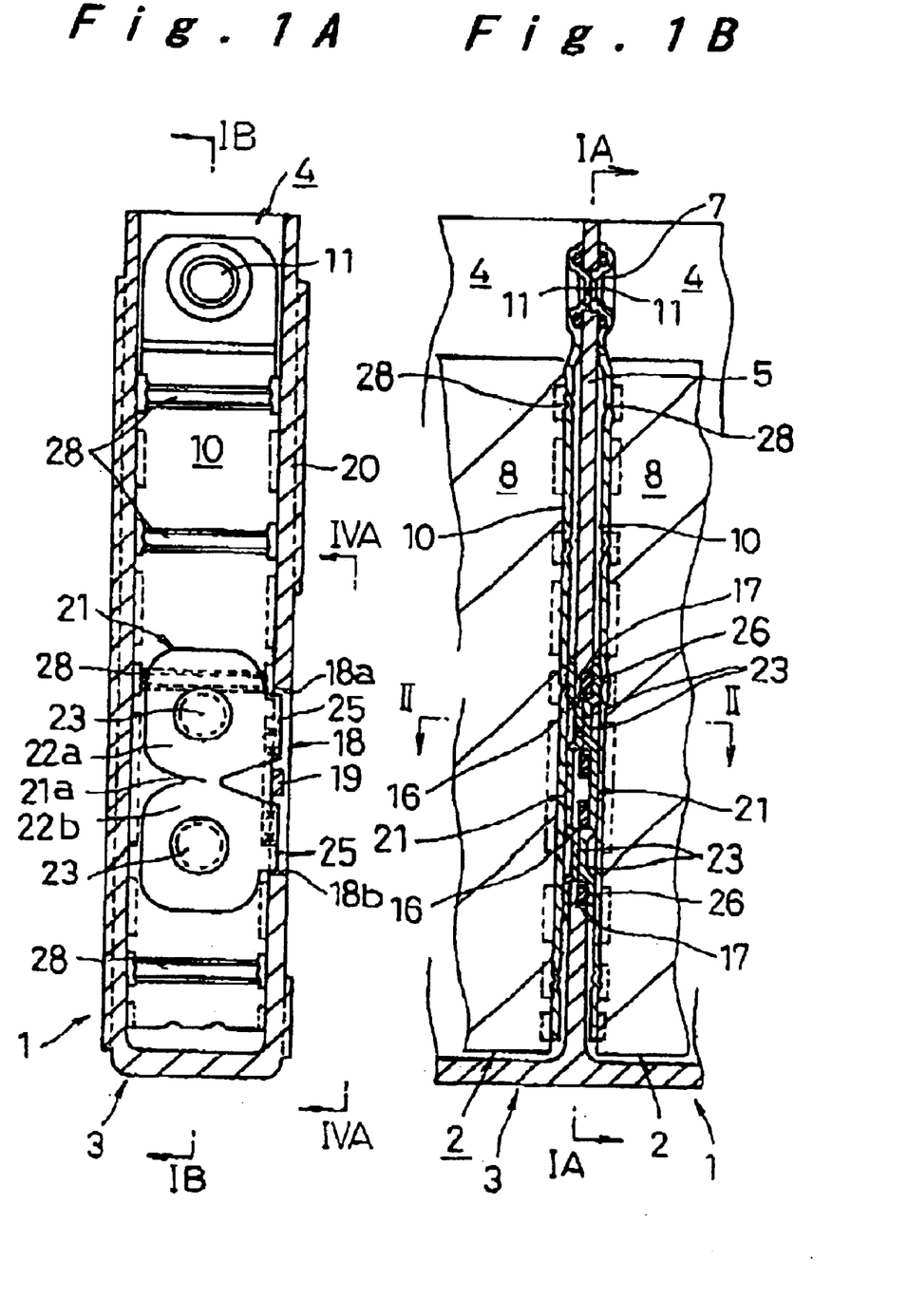
FIG. 1A is a longitudinal sectional side view taken in the direction of arrows IA—IA of FIG. 1B, illustrating a sealed prismatic battery according to one embodiment of the present invention.
FIG. 1B is a longitudinal sectional front view taken in the direction of arrows IB—IB of FIG. 1A.
Figure 2:
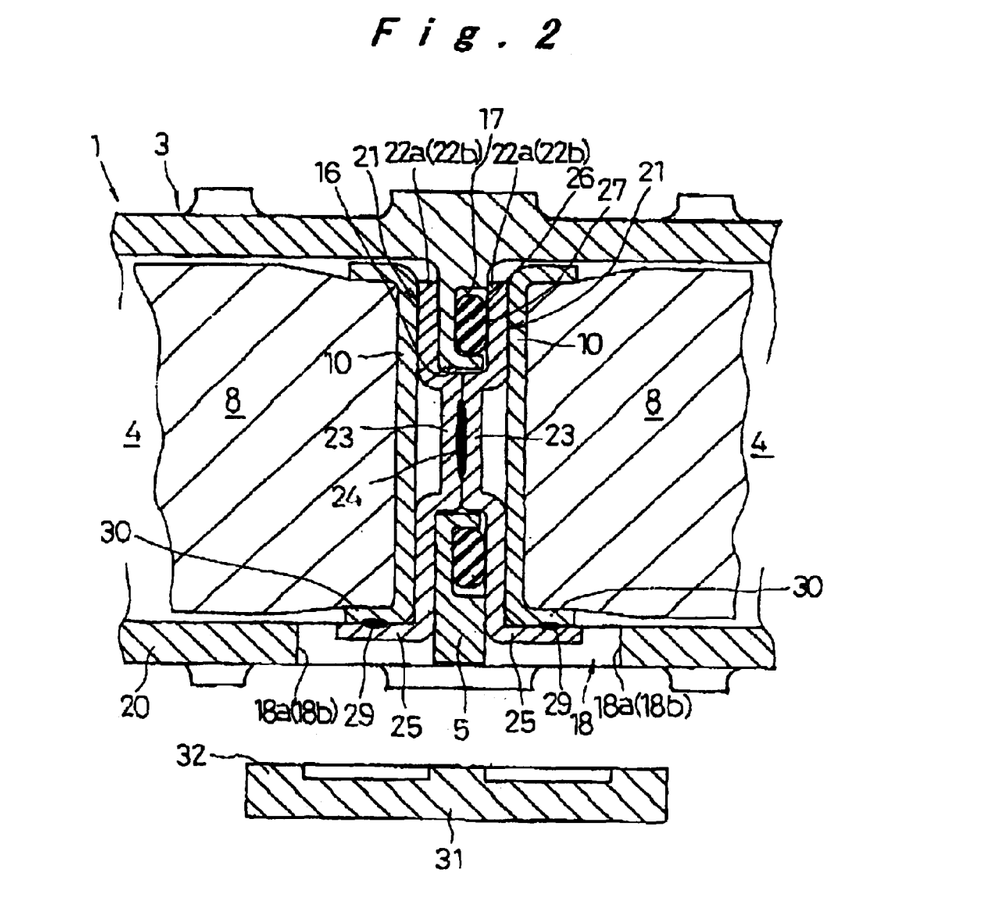
FIG. 2 is an enlarged cross-sectional top plan view taken in the direction of arrows II—II of FIG. 1B.

The sealed prismatic battery 1 of the present invention has a prismatic battery case 3 made of a plurality of prismatic cell cases 4, which have short lateral walls and long lateral walls and are connected together in such a manner that their short lateral walls are used as partition walls 5. The battery case 3 is made of synthetic resin such as a PP/PPE alloy which is repellent against liquid electrolyte. In the partition walls 5, connection holes 7 are formed in an upper part, and in addition, a pair of communicating holes 16 are formed at a suitable interval at upper and lower positions lower than the middle part. On one face of the partition walls 5 around these communicating holes 16 are formed sealing grooves 17.

In one side wall 20 of the battery case 3 is formed a pair of openings 18 at locations corresponding to the partition walls 5 such as to open to the cell cases 4 on both sides of the partition walls. These openings 18 are arranged at the same height as the pair of upper and lower communicating holes 16. They have a width so as to allow edge portions 30 that are bent of collectors 10 on both sides of the partition wall 5 to expose to a sufficient extent, and a height that is suitably set. In the illustrated example, a coupling piece 19 is provided across the openings 18 in a vertically central location for the purpose of reinforcement, and so both openings 18 are divided into upper and lower openings 18a, 18b, respectively.

On both sides of the partition wall 5 surrounding the communicating holes 16 are provided conductive connection plates 21, which are made of steel plate that is nickel-plated so as to be repellent against the liquid electrolyte. Each conductive connection plate 21 is formed of an upper connection plate 22a and a lower connection plate 22b that are coupled by a bridge portion 21a in the middle. In both connection plates 22a, 22b are formed connection bosses 23 that fit into the upper and lower communicating holes 16, respectively. These connection bosses 23 are abutted from both sides of each partition wall 5 and connected together via welds 24 formed by resistance welding. One side edge of each connection plate 22a, 22b on the side of one side wall of the battery case 3 where the openings 18 are formed is protruded towards the openings 18a, 18b, respectively, and bent in L-shape so as to form connection pieces 25 that face the openings 18a, 18b.

O-rings 26 are fitted in the sealing grooves 17 when the conductive connection plates 21 are placed on both sides of the partition walls 5, so that the O-rings 26 are compressed between the sealing grooves 17 and the conductive connection plates 21 to generate a sealing surface pressure. In addition, sealant 27 such as pitch is applied to the interface between the O-rings 26 and the conductive connection plates 21.

It would be preferable both in terms of processing efficiency and sealing performance to fill the sealing grooves 17 with pitch or the like and set the O-rings 26 therein, so that the O-rings 26 are temporarily retained there. The conductive connection plates 21 are then inserted into the cell cases 4 on both sides of each partition wall 5, and their connection bosses 23, 23 welded together.

After setting the conductive connection plates 21 on both sides of the partition walls 5 between the cell cases 4, electrode plate groups 8, to both sides of which collectors 10 have been bonded, are inserted into the cell cases 4 together with liquid electrolyte, whereby discrete cells 2 are constituted. In an upper part of the partition walls 5 of the battery case 3 are formed connection holes 7, so that the collectors 10, 10 of adjacent cells 2, 2 are connected via their connection bosses 11 that fit into the connection holes 7.

The electrode plate group 8 is made up of a plurality of positive and negative electrode plates that are stacked up alternately. Each positive electrode plate is enveloped in a bag-shaped separator having an opening on one side, so the separator is interposed between each pair of positive and negative electrode plates. One side edge of positive electrode plates and the other side edge of negative electrode plates are protruded in opposite directions so as to form respective lead portions 9. The positive electrode plates are made of a nickel foam metal coated with nickel hydroxide except for the lead portion 9. A portion of the nickel foam metal that is to become the lead portion 9 is compressed, and a lead plate is seam welded by ultrasonic welding to one face of this portion. The negative electrode plates are made of a nickel punched metal coated with negative electrode constituent materials including hydrogen-absorption alloy except for the lead portion 9.

Collectors 10 are made of nickel-plated steel plate and bonded to the lead portions 9 on both sides of the electrode plate group 8. The bond between the collectors 10 and lead portions 9 is achieved by electron beam welding or the like at a plurality of bonds 28 at vertically spaced points in the collectors 10, as shown in FIG. 1A and FIG. 1B.

When the electrode plate group 8 is accommodated in each cell case 4, part of the lateral edge bent portions 30 of collectors 10 which faces the openings 18 (18a, 18b) is in contact with the inner face of the connection pieces 25 of the conductive connection plates 21, and electrical connection therebetween is ensured by a weld 29 formed by resistance welding. Welding of the lateral edge bent portions 30 of collectors and the connection pieces 25 is carried out as follows: A pair of welding electrodes are abutted to the connection pieces 25, 25 of the upper and lower connection plates 22a, 22b and welding current is applied, which flows from the upper connection plate 22a into the lower connection plate 22b via the collector 10. Since the bridge portion 21a has a small cross section, short-circuiting current is negligible and the welding is achieved reliably. It is preferable in terms of welding that the connection plates 22a, 22b are completely separate, but the provision of the bridge portion 21a facilitates the handling of the conductive connection plates 21.

Figure 3:
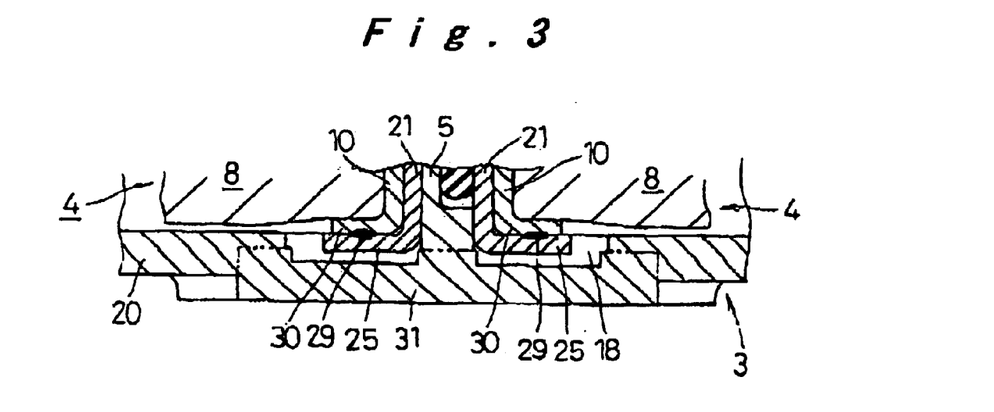
FIG. 3 is an enlarged cross-sectional top plan view of major parts in which a sealing plate is melt-bonded.
Figure 4A:
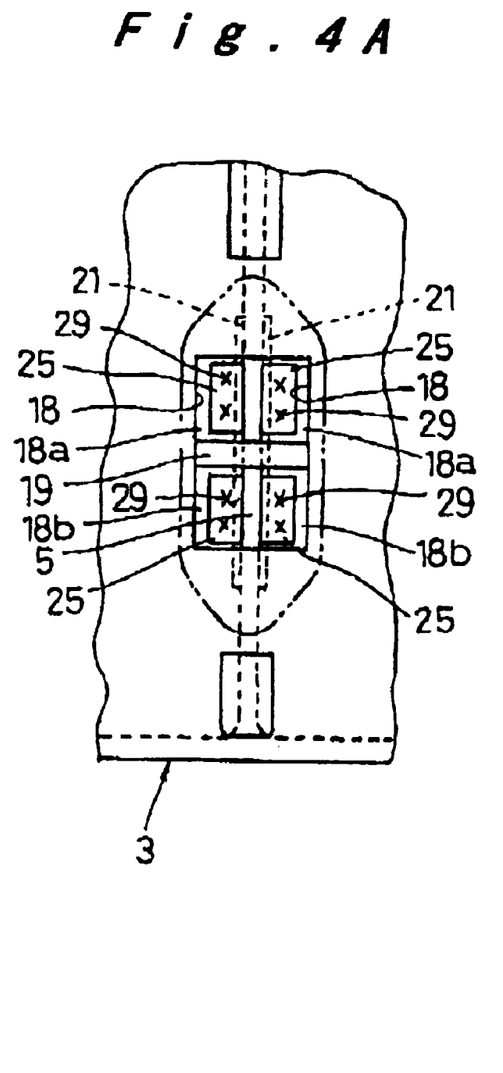
FIG. 4A is a front view of major parts taken in the direction of arrows IVA—IVA of FIG. 1A.
Figure 4B:
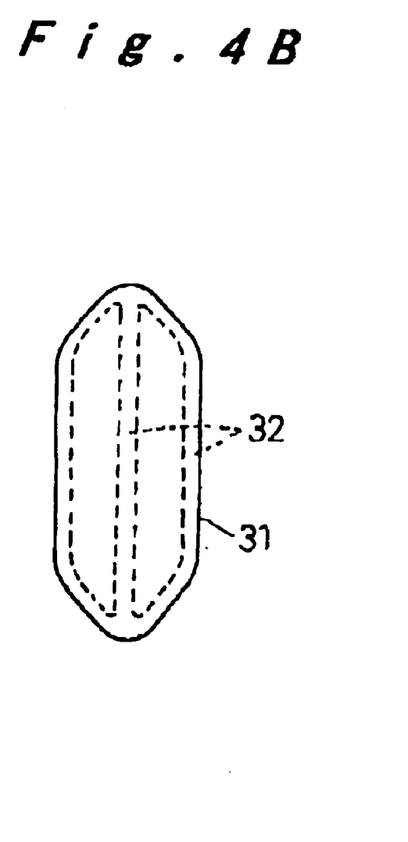
FIG. 4B is a front view of a sealing plate.

After connecting the connection pieces 25 of the conductive connection plates 21 and the lateral edge bent portions 30 of the collectors 10 by welding, sealing plates 31 shown in FIG. 4B are fitted to cover the openings 18 as illustrated in imaginary lines in FIG. 2 and FIG. 4A and melt-bonded as shown in FIG. 3, so that the openings 18 are sealed in a manner that separates the cell cases 4, 4 on both sides of the partition wall 5. The sealing plate 31 is provided with sealing basses 32 as shown in FIG. 4B at its periphery and at portions that will abut the end face of the partition wall 5 so as to ensure the seal. When melt-bonded, it becomes one piece with the side wall 20 of the battery case 3 as shown in FIG. 3.

According to this embodiment, collectors 10, 10 of adjacent cells 2, 2 facing each other via the partition walls 5 are connected at a location in the side wall 20 of the battery case 3 via the conductive connection plates 21 that extend through the partition walls 5. Collectors 10, 10 can thus be connected together at a desired location. Therefore, the connection path is shorter than the prior art example with a detouring current path around the top ends of the collectors 10, and the connection resistance between adjacent cells 2, 2 is accordingly reduced. Also, the current distribution between adjacent cells 2, 2 is made even, which further reduces the internal resistance per cell 2 and leads to higher power output.

The connection between the conductive connection plates 21 and collectors 10 is readily achieved by connecting the connection pieces 25 of the conductive connection plates 21 and the lateral edge bent portions 30 of the collectors 10 at the openings 18 formed in the side wall 20. The openings 18 are tightly sealed by the sealing plate 31 after establishing the connection, so that no liquid leakage occurs from or between the cells 2.

The conductive connection plates 21 disposed on both sides of the partition walls 5 are formed with connection bosses 23 that fit into the communicating holes 16 formed in the partition walls 5, and these connection bosses 23, 23 are connected together. Therefore, the basic structure of the prior art battery case 3 can be used with only additional communicating holes 16 formed as required. Sealing is achieved by the O-rings 26 interposed between the conductive connection plates 21 and the periphery of the communicating holes 16 in the partition walls 5, so liquid leakage through the communicating holes 16 is prevented. The sealant 27 provided in addition to the O-rings 26 fitted in the sealing grooves 17 ensures highly reliable sealing performance.

The connection between the connection bosses 23, 23 of the conductive connection plates 21, or between the connection pieces 25 of the conductive connection plates 21 and the lateral edge bent portions 30 of the collectors 10, can be achieved by various means such as laser beam welding, electron beam welding, resistance welding, or a conductive bond. Resistance welding is most preferable for the connection of the connection bosses 23, 23, since the welds 24 ensure reliable connection with lower resistance, which is advantageous for the realization of a high power output battery with low internal resistance.

In this embodiment, moreover, the collectors 10, 10 of adjacent cells 2, 2 are connected together via the connection holes 7 formed in the upper part of the partition walls 5, and likewise, the connection terminals 12 at either end of the battery case 3 are connected to the collectors 10 via the connection holes 7 formed in the end faces of the battery case 3. Therefore, the production equipment for the prior art sealed prismatic batteries in which collectors 10, 10 are connected together in an upper part can be utilized, with only the additional feature described above being applied to reduce the connection resistance. Having the connection terminals 12 for the connection with external terminals in the upper part of both end walls of the battery case 3 offers advantages of ease of connection with other sealed prismatic batteries 1 and ease of securing insulation when providing a water cooling mechanism or the like.

Figure 5A:
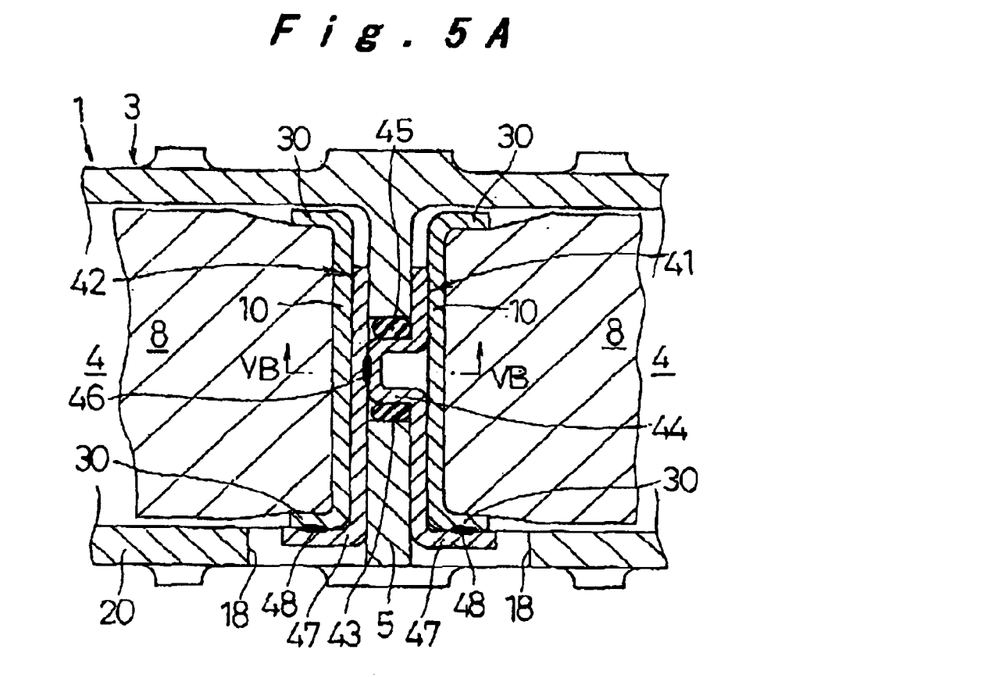
FIG. 5A to FIG. 5C illustrate a sealed prismatic battery according to another embodiment of the present invention, FIG. 5A being an enlarged cross-sectional top plan view of major parts, FIG. 5B being a cross section taken in the direction of arrows VB—VB of FIG. 5A, and FIG. 5C being a cross section taken in the direction of arrows VC—VC of FIG. 5B.
Figure 5B:
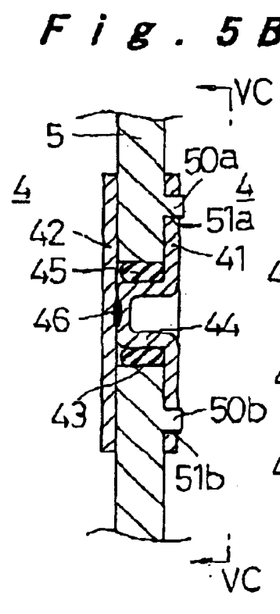
Figure 5C:
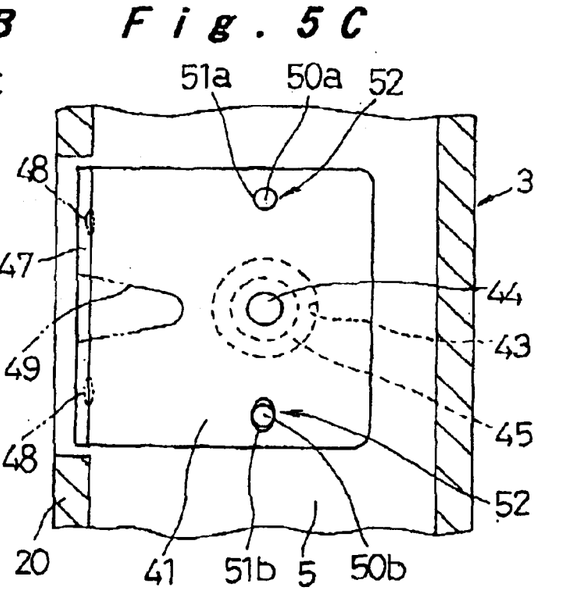

Next, another embodiment of the sealed prismatic battery according to the present invention will be described with reference to FIG. 5A to FIG. 5C. The basic structure is the same as the embodiment described in the foregoing, so the description will be made only with regard to the differences.

In this embodiment, one communicating hole 43 is formed in each of the partition walls 5, and pairs of conductive connection plates 41, 42 are placed on both sides of each of the partition walls 5. On one conductive connection plate 41 is formed a protruding shaft 44 which extends through the communicating hole 43 and touches the other connection plate 42. The tip of the protruding shaft 44 is connected to the conductive connection plate 42 via a weld 46 by resistance welding. An O-ring 45 is fitted in between the inner periphery of the communicating hole 43 and the outer periphery of the protruding shaft 44 in a compressed state to provide a predetermined sealing surface pressure.

One side edge of each of the conductive connection plates 41, 42 on the side of one side wall 20 of the battery case 3 where the openings 18 are formed is protruded towards the openings 18, and bent in L-shape so as to form a connection piece 47 that faces the openings 18. To the inner face of these connection pieces 47 are contacted part of the lateral edge bent portions 30 of collectors 10 of the electrode groups 8 facing the openings 18, and connected thereto via welds 48. The welds 48 can be formed by any of resistance welding, laser welding, or electron beam welding. Resistance welding can be carried out as follows: cut-outs 49 are formed at a vertically central location of the conductive connection plates 41, 42 from the connection pieces 47 into the central portion as indicated by imaginary lines in FIG. 5C. A pair of welding electrodes are abutted to the connection pieces 47 above and below the cut-outs 49, and welding current is applied. The connection pieces 47 and the lateral edge bent portions 30 are thereby connected together via the welds 48.

Laser beam welding can also advantageously be applied in terms of workability, since, in that case there is no need of providing cut-outs 49 or of applying pressure which is necessary for the resistance welding.

On one face of the partition walls 5 on the side on which the conductive connection plates 41 are arranged are protruded positioning bosses 50a, 50b above and below the communicating hole 43 at suitable intervals. Correspondingly, the conductive connection plates 41 are formed with positioning holes 51a, 51b with a slightly larger diameter than that of the positioning bosses 50a, 50b. Further, the positioning hole 51b is elongated to accommodate variations resulting from dimensional tolerances. The positioning bosses 50a, 50b extend through the positioning holes 51a, 51b and protrude therefrom.

Thus, with the protruding shaft 44 being inserted into the communicating hole 43 and the O-ring 45 fitted between them, whereby the shaft is automatically adjusted to be coaxial with the hole, and with the positioning bosses 50a, 50b fitted in respective positioning holes 51a, 51b, the protruding parts of the positioning bosses 50a, 50b are hot-melted using heated plates, so as to fix the conductive connection plate 41 to the partition wall 5. These positioning bosses 50a, 50b and positioning holes 51a, 51b constitute a fixing member 52 for positioning and fixing the conductive connection plate 41 to the partition wall 5. This fixing member 52 may be provided also to the conductive connection plate 42 for ease of providing the welds 46.

According to this embodiment, leakage prevention of the communicating hole 43 in the partition wall 5 is achieved by the O-ring 45 interposed between the inner periphery of the communicating hole 43 and the outer periphery of the protruding shaft 44 in a compressed state. The compression rate of O-rings 45 is thereby made precise and stable, and therefore reliable sealing performance is ensured. Also, with this structure, welding of the protruding shaft 44 of the conductive connection plate 41 to the conductive connection plate 42 can readily and reliably be performed without being affected by a reaction force from the compressed o-rings 45. The resultant connection is therefore reliable and has low resistance.

The conductive connection plate 41 is fixed to the partition wall 5 as being precisely positioned by means of the fixing member 52 consisting of the positioning bosses 50a, 50b and positioning holes 51a, 51b. Therefore, the conductive connection plates 41, 42, after being fixed in position, will not easily be moved by some external force, which means there will be no variations in the compressed state of O-rings 45 and their high sealing performance is maintained.

In the embodiments described above, openings 18 are formed in one side wall 20 of the battery case 3 at locations corresponding to the partition walls 5, and the connection pieces 25, 47 extending from one side of the conductive connection plates 21, 41, 42 are connected to the lateral edge bent portions 30 on one side of the collectors 10. Alternatively, the openings 18 may be formed in both side walls at locations corresponding to the partition walls 5 in a zigzag arrangement. Another option is to form the openings 18 in both side walls 20 of the battery case 3 such as to face each other, so that the collectors 10, 10 are connected to the connection pieces 25, 47 of the conductive connection plates 21, 41, 42 on both sides. Connecting the collectors 10, 10 together on their both Bides is advantageous because it leads to even lower connection resistance, and prevents adverse effects of one-sided load applied to the electrode plate groups 8 when performing the welding and any displacement caused by the load.

According to the sealed prismatic battery of the present invention, collectors of adjacent cells facing each other via the partition walls are connected together at a location in the side wall of the battery case via the conductive connection plates that extend through the partition walls. Therefore, collectors can be connected together at a desired location, and the connection path is made shorter than the case in which collectors are connected at their top ends via a detouring current path, whereby the connection resistance between adjacent cells is reduced. Also, the current distribution between adjacent cells is made even, which further reduces the internal resistance per cell, and makes power generation of the electrode plate groups uniform, leading to higher power output.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed prismatic battery comprising:
   a prismatic battery case comprising a plurality of prismatic cell cases coupled together via partition walls that extend transverse to side walls of the prismatic battery case;
   a plurality of electrode plate groups respectively encased in the cell cases and comprising a plurality of positive electrode plates and a plurality of negative electrode plates alternately stacked upon one another with separators interposed therebetween, one side edge of the positive electrode plates and the other side edge of the negative electrode plates protruding in opposite directions to provide respective lead portions; and
   a plurality of collectors each bonded to the lead portions on both sides of the electrode plate groups, wherein
   a plurality of openings are provided at least in one side wall of the prismatic battery case at locations corresponding to the partition walls so as to extend across two adjacent cell cases on both sides of each partition wall,
   pairs of conductive connection plates are arranged on both sides of each of the partition walls so as to be connected together through the partition walls, part of the conductive connection plates facing the openings,
   the collectors are connected to the part of the conductive connection plates facing the openings after the electrode plate groups are accommodated in the cell cases, and
   the openings are sealed in a manner that separates the cell cases.

2. The sealed prismatic battery according to claim 1, further including a communicating hole provided in each of the partition walls, wherein the conductive connection plates are provided with protrusions that fit into the communicating hole, the protrusions being connected together through the communicating hole, and wherein a sealing material is provided between a peripheral portion of the communicating hole in the partition walls and the conductive connection plates at least on one side of the partition walls.

3. The sealed prismatic battery according to claim 2, wherein said sealing material is an O-ring fitted in a sealing groove provided at a peripheral portion of the communicating hole in the partition wall.

4. The sealed prismatic battery according to claim 3, wherein sealant is provided between the O-ring and the conductive connection plate.

5. The sealed prismatic battery according to claim 2, wherein the protrusions of the conductive connection plates are connected by resistance welding.

6. The sealed prismatic battery according to claim 1, further including a communicating hole provided in each of the partition walls, wherein the conductive connection plates on one side of the partition walls are provided with protruding shafts that extend through the communicating hole and contact the conductive connection plates on the other side of the partition walls, and wherein an O-ring is provided between outer periphery of the protruding shafts and inner periphery of the communicating hole.

7. The sealed prismatic battery according to claim 6, further including a fixing member for fixing the conductive connection plates on one side of the partition walls to the partition walls.

8. The sealed prismatic battery according to claim 1, wherein the conductive connection plates and the collectors are connected by resistance welding.

9. The sealed prismatic battery according to claim 1, wherein the conductive connection plates and the collectors are connected by laser beam welding.

10. The sealed prismatic battery according to claim 1, further including a pair of connection terminals and connection holes provided in both end faces of the prismatic battery case and in an upper part of each of the partition walls, wherein the collectors of adjacent cell cases are connected together through the connection holes, and the collectors in the cell cases at both ends of the prismatic battery case are connected to the pair of connection terminals, respectively.

11. A sealed prismatic battery comprising:
   a prismatic battery case comprising a plurality of prismatic cell cases coupled together via partition walls that extend transversely to side walls of the prismatic battery case;
   a plurality of electrode plate groups, side edges of the electrode plates protruding from the cell cases to form lead portions;
   a plurality of collectors each secured to a lead portion;
   a plurality of openings in at least one side wall of the prismatic battery case positioned at locations corresponding to the partition walls so as to extend across two adjacent cell cases on each side of a partition wall;
   pairs of conductive connection plates provided on both sides of each of the partition walls so as to be connected through the partition walls, a part of the conductive connection plates facing the openings;
   the collectors being connected to a part of the conductive connection plates that face the openings; and
   a sealing plate that seals the opening so that the cell cases are separate.

* * * * *